United States Patent [19]

Baker et al.

[11] Patent Number: 5,509,095

[45] Date of Patent: Apr. 16, 1996

[54] CONDENSING AND COLLECTING OPTICAL SYSTEM WITH AXIALLY DISPLACED CONCAVE REFLECTOR AND OPTICAL FIBER

[75] Inventors: Glenn S. Baker, Studio City; Douglas M. Brenner, Los Angeles; Robert L. Piccioni, Thousand Oaks, all of Calif.

[73] Assignee: Cogent Light Technologies, Inc., Santa Clarita, Calif.

[21] Appl. No.: 189,661

[22] Filed: Feb. 1, 1994

[51] Int. Cl.$^6$ ............................. G02B 6/26; F21V 7/04
[52] U.S. Cl. ......................... 385/31; 385/33; 385/47; 385/38; 385/39; 362/32; 362/346; 362/347
[58] Field of Search .......................... 385/31, 33, 35, 385/38, 39, 47, 76, 77, 88, 89, 92, 115, 116, 133; 362/32, 261, 263, 267, 298, 346, 347

[56] References Cited

U.S. PATENT DOCUMENTS

| | | | |
|---|---|---|---|
| 3,122,330 | 2/1964 | Trentini | 362/261 X |
| 3,712,979 | 1/1973 | Padgitt | 362/261 X |
| 3,883,223 | 5/1975 | Hudson | 385/33 X |
| 3,926,501 | 12/1975 | Hama | 385/31 X |
| 4,523,257 | 6/1985 | Mori | 362/32 X |
| 4,747,660 | 5/1988 | Nishioka et al. | 385/31 X |
| 4,755,017 | 7/1988 | Kapany | 385/33 X |
| 4,757,431 | 7/1988 | Cross et al. | 362/261 |
| 4,883,333 | 11/1989 | Yanez | 385/33 X |
| 4,887,190 | 12/1989 | Sadamune et al. | 362/32 |
| 4,897,771 | 1/1990 | Parker | 362/298 |
| 4,902,093 | 2/1990 | Bowen | 385/31 |

FOREIGN PATENT DOCUMENTS

| | | | |
|---|---|---|---|
| 1383413 | 2/1964 | France | 362/261 X |

*Primary Examiner*—Brian Healy
*Attorney, Agent, or Firm*—Rothwell, Figg, Ernst & Kurz

[57] ABSTRACT

The present invention comprises a system for condensing and collecting electromagnetic radiation having a primary reflector disposed on one side of an electromagnetic radiation source and a target disposed on the opposite side of the source. The primary reflector includes a concave reflecting surface portion, which preferably forms the entire surface of the reflector. The concave surface portion of the primary reflector, which is preferably of a substantially toroidal shape, defines an optical axis and a primary center of curvature disposed along the optical axis. The source of electromagnetic radiation is located approximately on the optical axis but axially offset a first distance from the center of curvature in a direction toward the concave surface portion. The target, such as a single core fiber optic or a fiber optic bundle, is located approximately on the optical axis but axially offset a second distance from the center of curvature in a direction away from the concave surface portion for acquiring a substantially focused image of the source reflected by the concave surface portion. With this configuration, the first and second distances are approximately related by the equation $(1-z_s/r1)\times(1-z_i/r1)=1$ where $z_s$ is the first distance, $z_i$ is the second distance and $r1$ is the primary radius of curvature of the toroidal reflecting surface portion of the primary reflector when a toroidal reflector is used for partial compensation of aberrations. In an alternate embodiment, a secondary reflector may further be added behind the source on the side opposite the primary reflector to enhance further light collection. According to a second alternate embodiment, the system may also comprise a housing having sides with inner surfaces forming the primary reflector and the secondary reflector.

23 Claims, 5 Drawing Sheets

FIG. 3
_PRIOR ART_
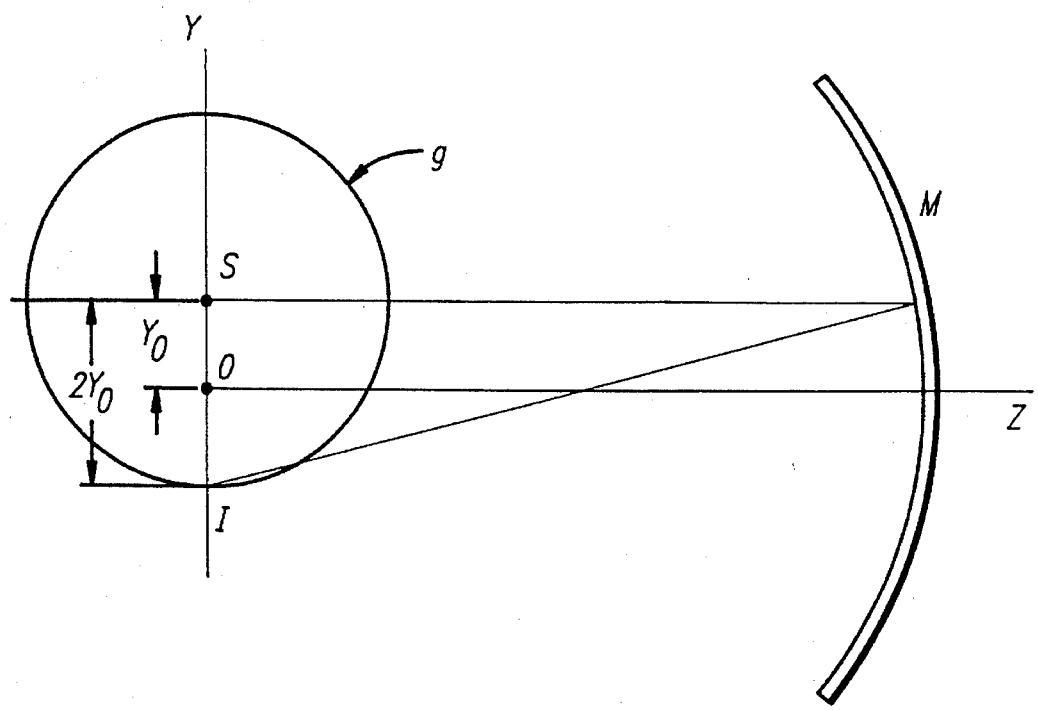
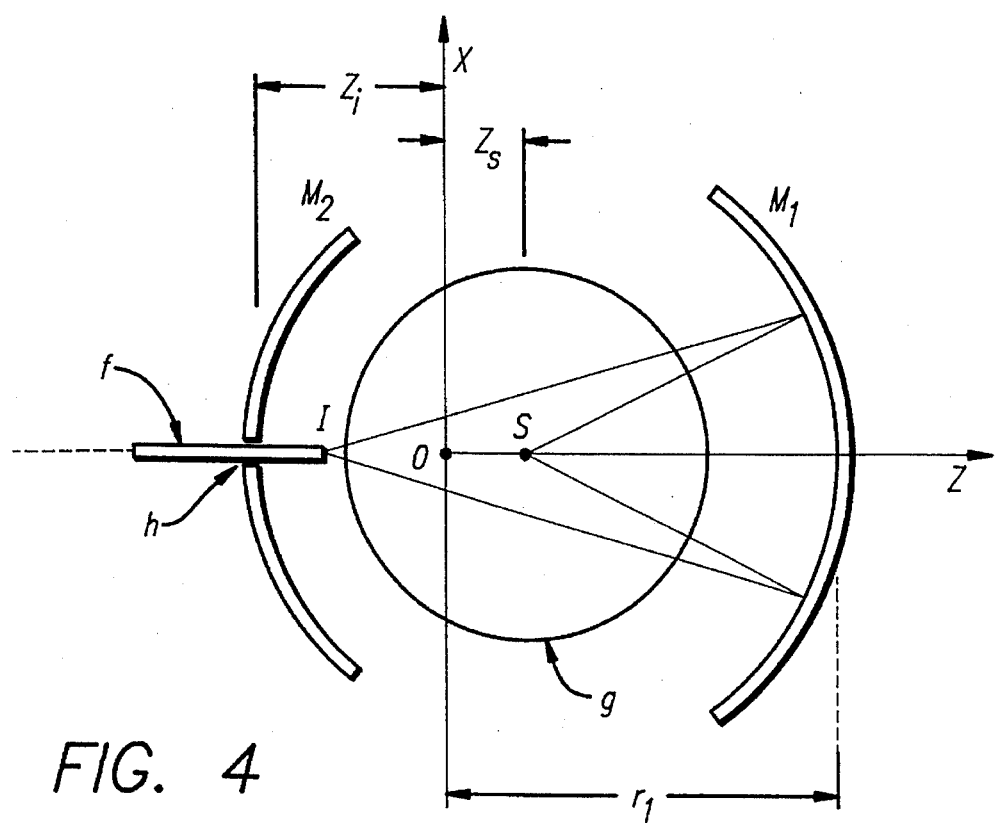
FIG. 4

CONDENSING AND COLLECTING OPTICAL SYSTEM WITH AXIALLY DISPLACED CONCAVE REFLECTOR AND OPTICAL FIBER

FIELD OF THE INVENTION

This invention relates to systems for collecting and condensing electromagnetic radiation, particularly a system for providing high intensity illumination of a small target such as an end of an optical fiber.

BACKGROUND OF THE INVENTION

Conventional collecting and condensing designs for electromagnetic radiation emphasize collecting and redirecting the maximum amount of light from a single point source radiating isotropically. In doing so, the ability of these designs to concentrate radiation flux into a small spot size is compromised. Adapting these designs to produce a small spot size results in a decrease in radiation flux because the emphasis of conventional designs (i.e., the collection and redirection of the maximum amount of light) conflicts with the goal of concentrating the light flux into the smallest possible spot size when the light originates from conventional non-coherent light sources. Thus, small spot size images may be obtained only with the corresponding penalty of decreased flux density.

There are two basic designs for optical collecting and condensing systems that are in common use. The first is a system of condenser lenses such as illustrated in FIG. 1. Condenser lenses have several problems, including the creation of chromatic and spherical aberrations, the high cost of corrective optics, the inherent difficulty in aligning the lenses and the large amount of space such a system demands. Ellipsoidal reflectors as shown in FIG. 2 are also used in prior art systems. Their problems include high cost and the unavoidable magnification of the image which reduces the flux density at the image. Both of these systems (FIGS. 1 and 2) tend to emphasize the collection and redirection of the maximum amount of light from a single point source as discussed above. Thus, they fail to optimize both spot size and light density.

A variation to the system illustrated in FIG. 1 was previously described in French Patent #1383413. In this configuration a spherical concave mirror having a center of curvature and an optical axis is used to collect and condense light from a filament source into a light guide. The source is placed at the center of curvature of the mirror and light is focused into the light guide at a point opposite the side on which the spherical mirror is located. Enhanced performance is achieved by placing a second spherical mirror on the side opposite from the primary spherical reflector to focus light back through the source to the primary reflector. A hole placed in the center of the secondary reflector allows placement of a light guide along the optical axis to collect the reflected radiation. Also described in Patent #1383413 is the use of a primary elliptical mirror configured as shown in FIG. 2, except that a secondary spherical reflector, having a center of curvature coincident with the source and placed at a distance between the primary and secondary focal points of the elliptical reflector, is used to increase the amount of collected light into a light guide. The light guide is placed along the optical axis at the secondary focal point and a hole is placed in the secondary reflector to permit light to enter the light guide.

U.S. Pat. No. 4,757,431, the disclosure of which is incorporated herein by reference, describes an improved condensing and collecting system employing an off-axis spherical reflector to increase the flux density at the target. As shown in FIG. 3, the prior art off-axis system has a source transversely displaced from the optical axis of the reflector and a target placed at an approximately symmetrical position with respect to the optical axis. However, such a system has certain disadvantages arising from the "off-axis displacement" of the source and target including the presence of astigmatism parallel to the direction of the off-axis displacement and the physical limitations inherent in the requirement to minimize this off-axis distance. The effect of astigmatism is to decrease the concentrating efficiency of the system and thereby reduce the flux collected at the target. Also, the requirement to minimize the off-axis distance between the source and the target due to the resulting astigmatic distortion imposes limitations on the physical dimensions of the source and target in such a system.

Accordingly, it is an object of the present invention to provide an on-axis optical system which enhances the collection of light emitted from a localized source of electromagnetic radiation and subsequently acquired by a small optical target.

It is another object of the present invention to provide an on-axis optical system comprising a source, a primary reflector and an optical target, in which both the source and optical target are in line with the optical axis of the primary reflector, but axially offset from one another.

It is a further object of the present invention to provide an on-axis optical system which eliminates the astigmatic aberrations and physical limitations inherent in an off-axis system.

SUMMARY OF THE INVENTION

To achieve these and other objects, the present invention comprises a system for condensing and collecting electromagnetic radiation having a primary reflector disposed on one side of an electromagnetic radiation source and a target disposed on the opposite side of the source. The primary reflector includes a concave reflecting surface portion, which preferably forms the entire surface of the reflector.

The concave surface portion of the primary reflector, which is preferably of a substantially toroidal shape, defines an optical axis and a primary center of curvature disposed along the optical axis. The source of electromagnetic radiation is located approximately on the optical axis but axially offset a first distance from the primary center of curvature in a direction toward the toroidal surface portion. The target, such as a single core fiber optic or a fiber optic bundle, is located approximately on the optical axis but axially offset a second distance from the primary center of curvature in a direction away from the toroidal surface portion for acquiring a substantially concentrated image of the source reflected by the toroidal surface portion.

With this configuration, the first and second distances are approximately related by the equation $(1-z_s/r) \times (1-z_i/r) = 1$ where $z_s$ is the first distance, $z_i$ is the second distance and $r$ is a radius of curvature of the spherical reflecting surface portion of the primary reflector.

In an alternate embodiment, a secondary reflector, preferably having a surface concave relative to the source, may further be added behind the source on the side opposite the primary reflector to enhance further light collection. In order to permit the coupling of the focused light into the fiber optic target, the secondary reflector is adapted with a small central hole coincident with the optical axis of the primary reflector.

According to another alternate embodiment, the system may further comprise a housing having sides with inner surfaces forming the primary reflector and the secondary reflector. In this case, the primary and secondary reflectors may be integrally joined together to form a contiguous reflector disposed about the inner surfaces of the housing. Furthermore, the housing may also comprise a top and a bottom affixed to the sides of the housing to form a sealed enclosure capable of being filled with a gas. In this embodiment, a window is provided at a radiation collecting end of the housing for passage of radiation from within the housing to the radiation collecting end of the fiber optic target which is disposed either adjacent to or distant from the window.

BRIEF DESCRIPTION OF THE DRAWINGS

FIG. 3 is a schematic view in the Y-Z plane of a prior art off-axis optical system employing a spherical reflector.

FIG. 4 is a schematic view in the X-Z plane of one embodiment of the present invention showing the primary and secondary reflectors as separate elements.

DETAILED DESCRIPTION OF THE INVENTION

In the following description, for purposes of explanation and not limitation, specific details are set forth, such as particular numbers, dimensions, optical components, etc. in order to provide a thorough understanding of the present invention. However, it will be apparent to one skilled in the art that the present invention may be practiced in other embodiments that depart from these specific details. In other instances, detailed descriptions of well-known devices and techniques are omitted so as not to obscure the description of the present invention with unnecessary detail.

In accordance with the present invention, as shown in FIGS. 4–7, a condensing and collecting optical system comprises at least three main components:

(1) SOURCE. An optical point source of electromagnetic radiation. In the context of this invention, a point source S is any compact source S of electromagnetic radiation whose angular extent is small. Typically, the linear angular size of such a source S is no more than 0.1 radian. For example, a typical source S may be an electric arc lamp with an arc gap of approximately 1 mm placed in front of a concave reflector at a distance of approximately 5 cm. In the preferred embodiment, however, the source S is a compact xenon arc lamp with a one (1) mm arc length and contained in an aspherical glass enclosure. However, other enclosures such as ceramic may also be used as long as the radiation can be transmitted out from the source. For example, a cylindrical enclosure containing a window at each end of the cylinder would permit radiation to be transmitted from the source S. In general, any source S of electromagnetic radiation which is small relative to the size of the target may be used, including electric AC and DC arc lamps, gas-discharge lamps, filament lamps, and light emitting diodes. Furthermore, the types of radiation emitted by a particular source S may comprise pulsed radiation, continuous-wave radiation, coherent radiation, incoherent radiation, monochromatic radiation, broad-band radiation and narrow-band radiation.

(2) PRIMARY REFLECTOR. The primary reflector M1 focuses electromagnetic radiation from the source S onto the target T. As shown in FIG. 4, the primary reflector M1 comprises a concave reflecting surface portion P concave relative to the source S. According to the preferred embodiment, the reflecting surface portion P preferably forms the entire surface of the primary reflector M1. Referring to FIG. 4, the optical system of the present invention is arranged in a spatial coordinate system having orthogonal x, y, and z axes such that the center of curvature of the concave reflecting portion P is located at the origin O and its optical axis is coincident with the z axis.

Figure 1:
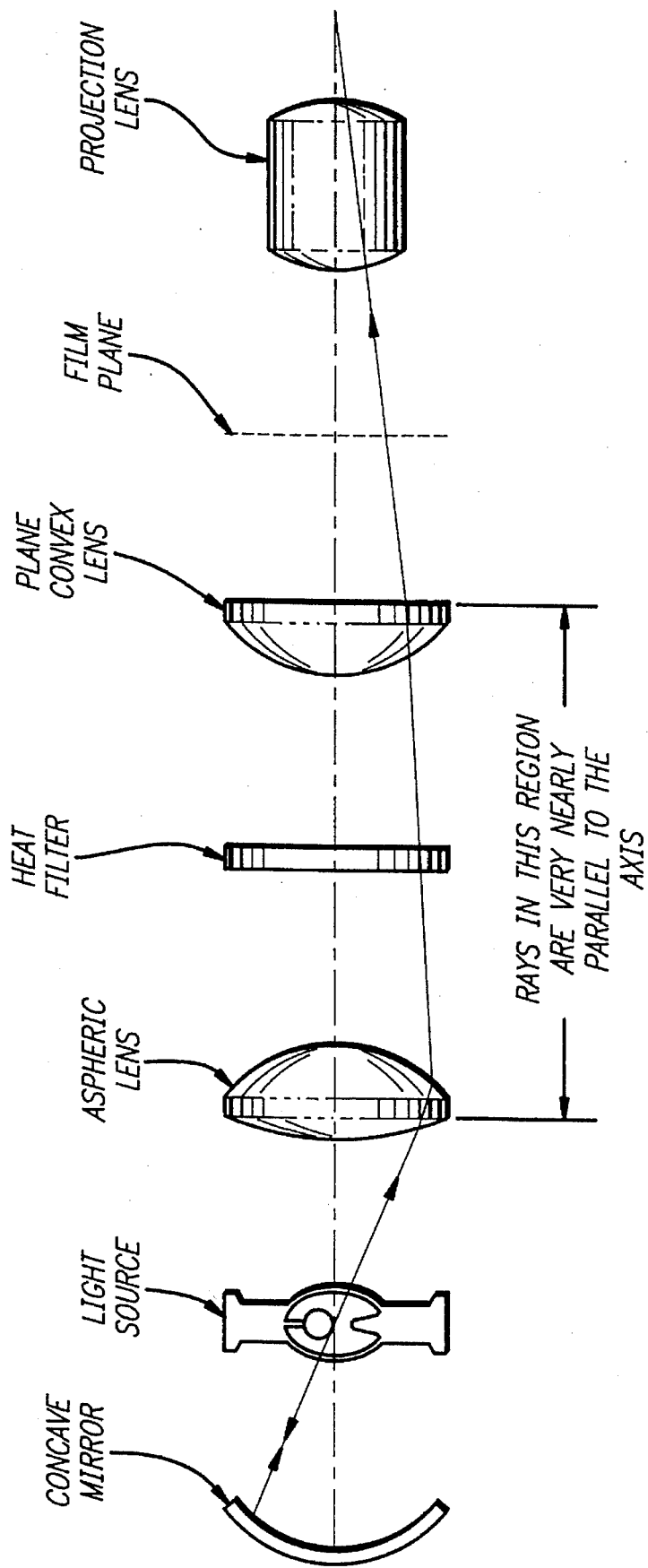
FIG. 1 is a schematic illustration of a prior art condenser lens system.
Figure 2:
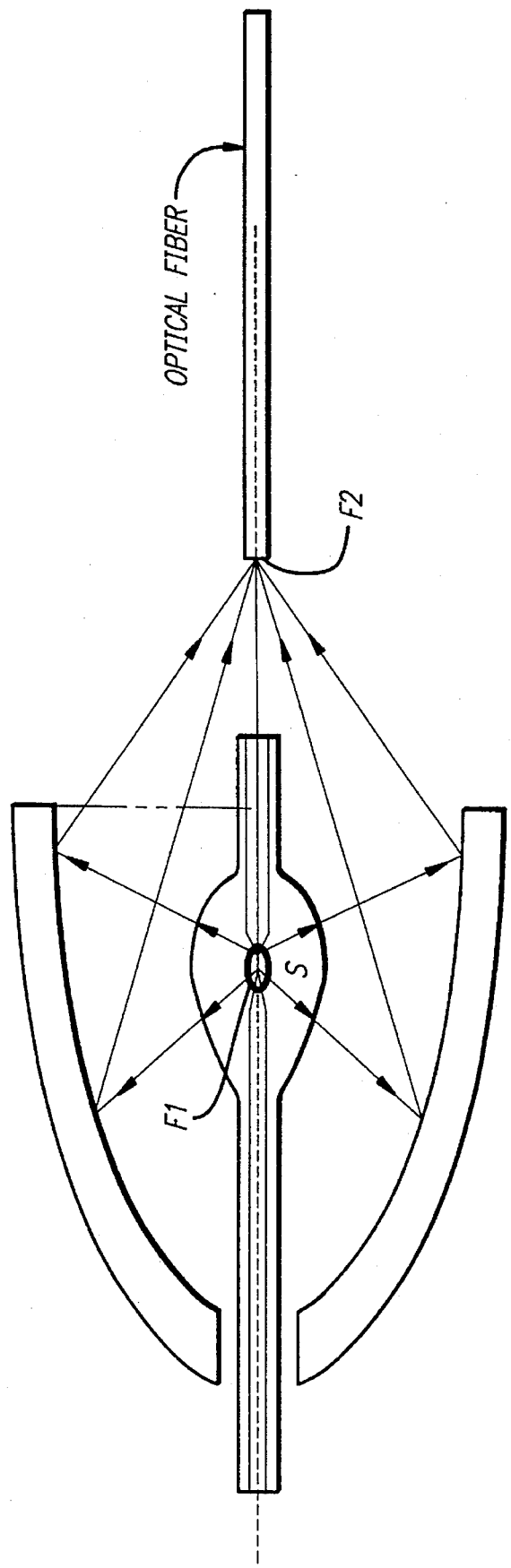
FIG. 2 is a schematic illustration of a prior art elliptical reflector system wherein the source is placed at a first focal point and the target is placed at the second focal point of an imaginary ellipse partially outlined by the reflector.
Figure 5:
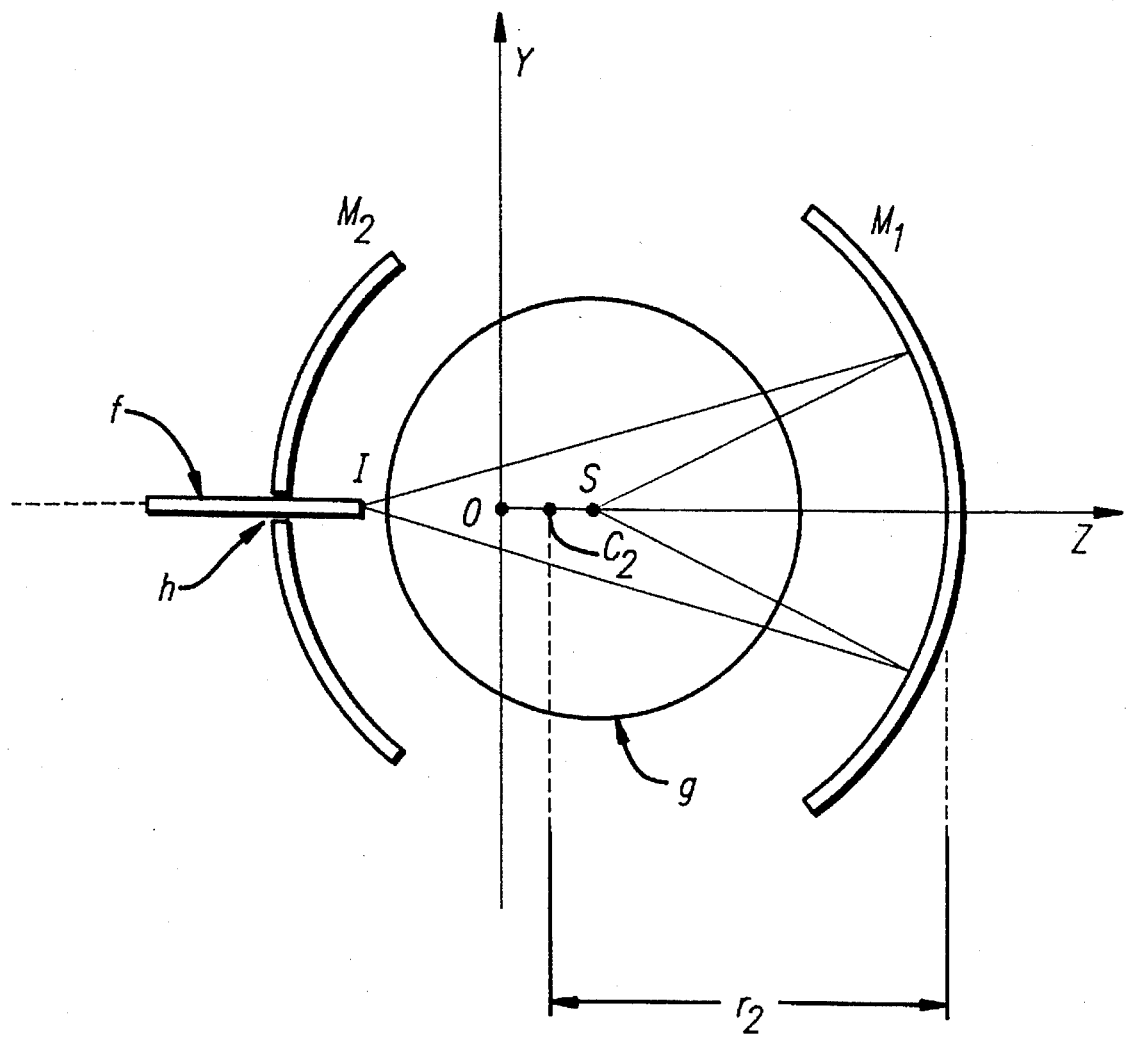
FIG. 5 is a schematic view in the Y-Z plane of one embodiment of the present invention showing the primary and secondary reflectors as separate elements.

Although many geometric configurations of the concave reflecting surface portion P can be implemented, such as portions of a spheroid, a paraboloid, an ellipsoid, etc., the present invention preferably utilizes a substantially toroidal reflecting surface portion P. As shown in FIGS. 4 and 5, the toroidal reflecting surface portion P has a primary radius of curvature r1 in the x-z plane (where the center of curvature of the toroidal reflector M1 in the x-z plane is coincident with the origin O in FIG. 4) and a secondary radius of curvature r2 in the y-z plane (where the center of curvature of the toroidal reflector M1 in the x-z plane is placed at the point c2 in FIG. 5). Additionally, the optical axis of the toroidal reflector M1 is coincident with the z-axis. The primary radius r1 is chosen so as to place the image point of collected radiation on the side opposite to the source, whereas the secondary radius r2 is chosen so as to reduce optical aberrations caused by the glass enclosure g of the source which acts as a lens.

The purpose of having r2 not equal to r1 is to bring the image point of rays in the y-z plane in coincidence with rays in the x-z plane so as to reduce the offset between the rays caused by the lensing of a particular source envelope g. For source enclosures that do not create any optical aberration, or for sources that have no enclosure, the primary radius r1 will be equal to the secondary radius r2 so that the primary reflecting surface portion P becomes spherical. Although a substantially spherical concave mirror could be used in all cases, the curved envelope g enclosing many sources, such as a DC arc lamp, causes elliptical aberrations which require optical compensation.

In principal, an exact optical correction can only be done by modeling the surface corrections of the mirror required to compensate for the aberrations numerically. The resulting surface would be highly non-spherical. For practical systems, aberrations are greater in the y-z plane than the x-z plane and result in the focal points of rays in each of the two planes being somewhat off-set from each other. An approximate, but practically useful, solution involves the use of a toroidal surface having r1 of the x-z plane not equal to r2 of the y-z plane thereby permitting a partial correction and therefore reducing optical aberrations and other imperfections. By adjusting the secondary radius r2 of a toroidal reflector, a less distorted image can be formed, permitting overlap of image points in both planes and resulting in higher collection efficiency of radiation. The net result compared to a spherical reflector is to improve the condensing properties of the system so as to collect a greater fraction of light into a small target such as an optical fiber.

Furthermore, for practical purposes, the toroidal or spherical surface portion P may be exposed to optical preparations such as polishing and application of a reflective coating material (e.g., aluminization) to either of a first, glass-air surface interface or a second housing material-glass surface interface.

(3) TARGET. The target T is a small object which needs to be illuminated with the highest density electromagnetic radiation possible. In the preferred embodiment, the target T is a single core optical fiber f with a diameter of approximately 0.1 mm. However, the target T may also comprise a target T selected from the group of one or more optical fiber(s) f having a radiation collection end(s) c polished at an angle perpendicular to a longitudinal axis of the collection end(s) c of the optical fiber(s) f and one or more optical fiber(s) f having a radiation collection end(s) c polished at an angle other than perpendicular to a longitudinal axis of the collection end(s) c of the optical fiber(s) f.

With reference to the prior art FIG. 3, a conventional optical system is illustrated employing an "off-axis" spherical reflector in accordance with the teachings of the above-mentioned U.S. Pat. No. 4,757,431. A spherical mirror M has an optical axis which defines the z axis of a coordinate system with the origin O disposed at the center of curvature of the mirror M. A source S is located on the y axis, displaced a distance $y_0$ from the origin. Rays from the source S are reflected by the mirror M and converge near a point displaced a distance $y_0$ below the optical axis z to form a real image I of the source S.

However, off-axis optical systems have inherent drawbacks including the presence of astigmatism parallel to the direction of the off-axis displacement and the physical limitations inherent in the requirement to minimize the off-axis distance $y_0$. The effect of astigmatism is to produce a point image I which is not properly focused nor imaged at unit magnification at the target T. Furthermore, the resulting astigmatism decreases the concentrating efficiency of the system and thereby reduces the flux collected at the target T. Also, the need to reduce the off-axis distance $y_0$ between the source S and the target T in order to minimize the astigmatic distortion imposes limitations on the physical dimensions of the source S and the target T which can be utilized in such a system.

In comparison, the on-axis system of the present invention does not suffer from the above-noted problems due to the fact that the astigmatism which is caused by the off-axis distance $y_0$ in the conventional off-axis system is eliminated. Therefore, a substantially focused image point I having unit magnification at the target T may, in principle, be obtained with the present invention. Additionally, the physical size of the system of the present invention is limited only by the size of the source S, while the size of the source S itself is limited only by the curvature of the primary reflector M1.

With reference to the present invention, as shown in FIGS. 4-7, a coordinate system is defined such that the origin O is located at the center of curvature of the concave primary reflector M1 and the z axis coincides with the optical axis of the reflector M1. In the preferred embodiment of the invention, however, the reflector M1 is substantially toroidal in shape with a primary radius of curvature r1 having a primary center of curvature with respect to the rays in the x-z plane coincident with the origin O of the coordinate system. The secondary radius of curvature r2 defines a secondary center of curvature with respect to the rays in the y-z plane located at the point c2. Referring specifically to FIG. 4, the source S is located on the optical axis z of the reflector M1 and is displaced by a first distance $z_s$ from the primary center of curvature O. The location of the point S is thus defined by the coordinates $(0,0,z_s)$ where $z_s>0$. Similarly, an image I of the source S is created on the optical axis z of the primary reflector M1 and is displaced by a second distance $z_i$ from the primary center of curvature O. Accordingly, the location of the point I is thus defined by the coordinates $(0,0,z_i)$ where $z_i<0$. The values $z_s$ and $z_i$ are approximately related by the equation:

$$(1-z_s/r1)*(1-z_i/r1)=1$$

As mentioned above, the preferred embodiment of the present invention employs an electric arc lamp as the source S. Such a lamp generally has a cylindrical glass envelope which is denoted as g in FIGS. 3, 4, 5 and 6. With reference to FIG. 4, the first distance $z_s$ is preferably selected so that the image point I will lie just outside of the glass envelope g on the side opposite the primary reflector M1. For such a configuration, the magnification of the source spot size at the image point I is given by:

$$m=(1-z_i/r1)/(1-z_s/r1)$$

It will be observed that for $z_s>0$ and $z_i<0, m>1$. The numerical aperture (NA) of the primary reflector M1 as seen from the image point I will be equal to the numerical aperture as seen from the source S divided by the magnification factor m. Whereas it is not possible to achieve unit magnification, this system minimizes the degree of magnification to the extent that it is possible to minimize $z_i$ and $z_s$.

In reducing this invention to practice, it is found that optical aberrations are created by the enclosure of the source itself, typically an aspherical glass envelope g, which itself acts like a lens. The extent of optical aberrations depends on both the shape and uniformity of the glass envelope g. Full compensation can only be done by adjusting the profile of the reflector M1 numerically which makes it highly non-spherical. However, compensation for the optical aberrations can be in part achieved by choosing a toroidal concave reflector as the primary reflecting surface with a secondary radius r2 chosen so as to compensate for the lensing effect of the lamp envelope. In this respect, a toroidal primary reflector M1 is preferable to a spherical reflector since the latter cannot provide any compensation for optical aberrations.

The present invention differs from the prior art French Patent #1383413 in that the location of the source S is not coincident with the center of curvature of the spherical reflector used therein. In the preferred embodiment, however, a toroidal primary reflector M1 partially compensates for optical aberrations caused by a lamp envelope g or enclosure. If no enclosure is present or the source S and reflector are enclosed within the same enclosure, the alternative embodiment would consist of a spherical reflector since for this embodiment the primary and secondary radii r1, r2 of the toroidal reflector would be equal.

The primary loss of collection efficiency in the present invention arises from shadowing effects created by the source S itself, whether it be a filament, pair of electrodes, or other method for generating electromagnetic radiation. Whereas the present invention produces superior imaging over that of the prior art, it is less efficient in transmitting radiation to the target. However, enhancement in the collecting efficiency may be realized by adding a secondary reflector M2 behind the source S on the side opposite the primary reflector M1. The center of curvature of the secondary reflector M2 should coincide with the point S. Furthermore, the secondary reflector M2 should be adapted with a small central hole h coincident with the optical axis of the primary reflector M1 through which a target T, such as the collection end c of a fiber optic f, can pass so that the collection end c of the fiber f can be positioned at the point I. Preferably, the secondary reflector M2 has a substantially spherical reflecting surface concave relative to the source S. Yet, the reflecting surface of the secondary reflector M2 may also form a portion of a shape comprising a substantially toroidal shape or an aspherical toroidal shape. In addition, the reflecting surface of the secondary reflector M2 can be treated with an optical preparation in order to control the flux of the radiation.

Figure 6:
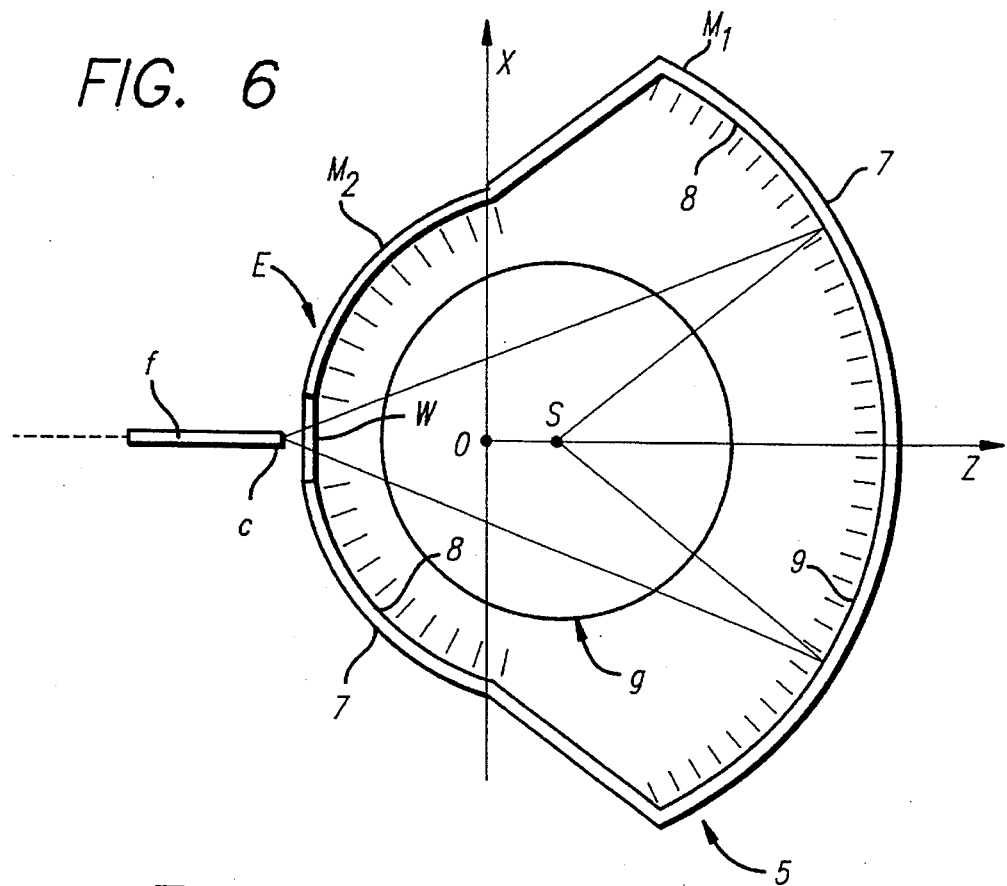
FIG. 6 is a schematic view in the X-Z plane of another embodiment of the present invention showing an implementation of the primary and secondary reflectors disposed as a single contiguous reflector within a housing having a planar window at the radiation collecting end of the housing.
Figure 7:
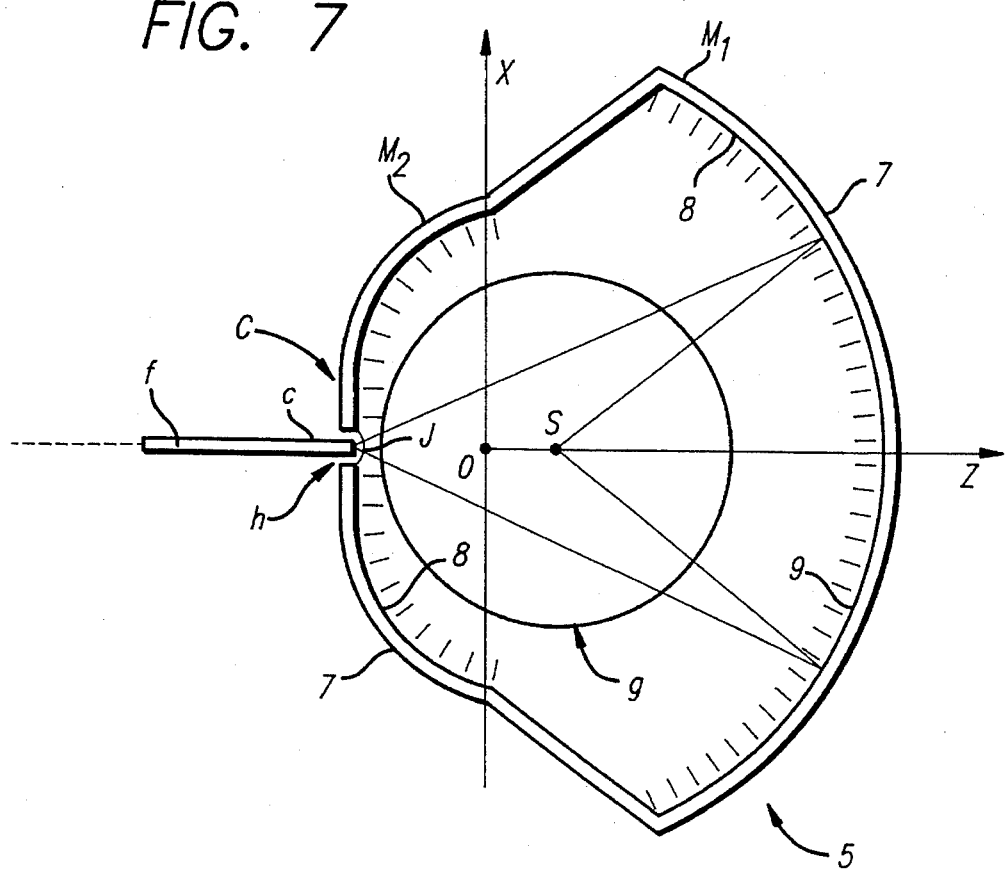
FIG. 7 is a schematic view in the X-Z plane of another embodiment of the present invention showing an implementation of the primary and secondary reflectors disposed as a single contiguous reflector within a housing having a hemispherical window.

According to an alternate embodiment of the present invention, shown in FIGS. 6 and 7, the system may further comprise a housing 5 having sides 7 with inner surfaces 8 forming the primary reflector M1 and the secondary reflector M2. In this case, the primary and secondary reflectors M1, M2 (i.e., their reflecting surfaces) may be integrally joined together to form a contiguous reflector 9 disposed about the inner surfaces 8 of the housing 5. The housing is preferably made out of ceramic although a wide variety of materials may be used including glass, pyrex, quartz, etc. Furthermore, the housing 5 may also comprise a top and a bottom affixed to the sides 7 of the housing 5 to form a sealed enclosure capable of being filled with a gas. In this manner, the housing 5 may be pressurized with an ionizing gas and fitted with the electrodes of an arc lamp S chosen to maximize brightness and minimize the angular extent of the arc produced.

Additionally, a window W can be provided at a radiation collecting end E of the housing 5 for passage of radiation from within the housing 5 to the radiation collecting end c of an optical fiber f. Accordingly, the radiation collecting end c of the fiber(s) f may be disposed adjacent to the window W or distant from the window W. The window W itself may comprise a planar surface P formed from a substantially transparent, non-imaging optical element or a substantially transparent imaging optical element (see FIG. 6), or alternatively, a planar surface P having a transparent, non-imaging, hemispherical window J centered about the image point I formed within the planar surface P (see FIG. 7). Once again, the window W can be treated with an optical preparation in order to control the radiation flux.

It will be recognized that the above described invention may be embodied in other specific arrangements and housings without departing from the spirit or essential characteristics of the disclosure. Thus, it is understood that the invention is not to be limited by the foregoing illustrative details, but rather is to be defined by the appended claims.

I claim:

1. A system for condensing and collecting electromagnetic radiation comprising:

a primary reflector having a concave reflecting surface portion, the concave surface portion having an optical axis and a primary center or curvature disposed along the optical axis;

a source of electromagnetic radiation having an envelope, said source located approximately on the optical axis but axially offset a first distance from the primary center of curvature of the concave surface portion in a direction toward the concave surface portion; with said primary reflector configured to reflect substantially all said radiation from said source back through said envelope; and a target located approximately on the optical axis but axially offset a second distance from the primary center of curvature of the concave surface portion in a direction away from the concave surface portion for acquiring a substantially focused image of the source reflected by the concave surface portion.

2. The system of claim 1, wherein the first and second distances are approximately related by the equation $$(1-z_s/r1) \times (1-z_i/r1) = 1$$

where $z_s$ is the first distance, $z_i$ is the second distance and r1 is a primary radius of curvature of the concave reflecting surface portion of the primary reflector.

3. The system of claim 1, wherein the concave surface portion comprises one of a substantially parabolic shape, a substantially elliptical shape, a substantially toroidal shape and a substantially aspheric shape.

4. The system of claim 1, wherein the concave surface portion comprises a substantially toroidal shape to form a toroidal surface portion having the primary center of curvature and a corresponding primary radius of curvature in a first plane and a secondary center of curvature and corresponding secondary radius of curvature in a second plane perpendicular to the first plane, the primary radius of curvature having a different length than the secondary radius of curvature for reducing optical aberrations caused by a particular source envelope surrounding the source by bringing a first image point produced by light rays in the first plane in coincidence with a second image point produced by light rays in the second plane.

5. The system of claim 1, wherein the concave surface portion forms the entire surface of the primary reflector.

6. The system of claim 1, wherein the source of electromagnetic radiation comprises a light source selected from the group consisting of an electric AC arc lamp, an electric DC arc lamp, a gas-discharge lamp, a filament lamp, a light emitting diode, and a semi-conductor laser.

7. The system of claim 1, wherein the radiation emitted by the source comprises radiation selected from the group consisting of pulsed radiation, continuous-wave radiation, coherent radiation, incoherent radiation, monochromatic radiation, broad-band radiation, narrow-band radiation and any combination of pulsed radiation, continuous-wave radiation, coherent radiation, incoherent radiation, monochromatic radiation, broad-band radiation and narrow-band radiation.

8. The system of claim 1, wherein the target comprises a target selected from the group consisting of at least one optical fiber having a proximal end cut at an angle perpendicular to a longitudinal axis of the proximal end of the optical fiber and at least one optical fiber having a proximal end cut at an angle other than perpendicular to a longitudinal axis of the proximal end of the optical fiber.

9. The system of claim 1, wherein the source of radiation comprises a lamp having an envelope, and a corrective optic is disposed in a position selected from the group consisting of a first position between the concave surface portion of the primary reflector and the source and a second position between the source and the target to compensate for optical aberrations in the substantially focused image caused by the envelope of the lamp.

10. The system of claim 1, wherein the system further comprises a secondary reflector disposed substantially opposite from the concave reflecting portion of the primary reflector relative to the source for reflecting radiation emitted from the source back through the source and onto the concave reflecting surface portion of the primary reflector.

11. The system of claim 10, wherein the secondary reflector has a reflecting surface concave relative to the source comprising a portion of a shape selected from the group consisting of a substantially toroidal shape, a substantially spherical shape and a substantially aspheric shape.

12. The system of claim 11, wherein the reflecting surfaces of the primary reflector and the secondary reflector are treated with at least one optical preparation to control the radiation flux.

13. The system of claim 10, wherein the target comprises an optical fiber having a collection end for receiving radiation reflected from the concave surface portion of the primary reflector, and the secondary reflector has a surface with an aperture formed in the surface coincident with the optical axis for passage of the collection end of the optical fiber.

14. The system of claim 10, wherein the system further comprises a housing having sides with inner surfaces forming the primary reflector and the secondary reflector.

15. The system of claim 14, wherein the housing further comprises a top and a bottom affixed to the sides of the housing to form a sealed enclosure capable of being filled with a pressurized gas.

16. The system of claim 14, wherein the primary and secondary reflectors are integrally joined together to form a contiguous reflector disposed about the inner surfaces of the housing.

17. The system of claim 14, wherein the housing further comprises a window disposed at a radiation collecting end of the housing for passage of radiation from within the housing to a proximal end of an optical fiber selected from the group consisting of a first optical fiber having a radiation collecting end disposed adjacent to the window and a second optical fiber having a radiation collecting end disposed distant from the window.

18. The system of claim 17, wherein the window comprises a planar surface formed from a material selected from the group consisting of a substantially transparent, non-imaging optical element and a substantially transparent imaging optical element.

19. The system of claim 17, wherein the window comprises a planar surface having a transparent, non-imaging, hemispherical window formed within the planar surface, the hemispherical window being centered about the substantially focused image reflected by the spherical surface portion of the primary reflector.

20. The system of claim 17, wherein the window is treated with at least one optical preparation to control the radiation flux.

21. A system for condensing and collecting electromagnetic radiation comprising:
a primary reflector having a concave reflecting surface portion, the concave surface portion having an optical axis and a primary center of curvature disposed along the optical axis;
a source of electromagnetic radiation located approximately on the optical axis but axially offset a first distance from the primary center of curvature of the concave surface portion in a direction toward the concave surface portion;
a target located approximately on the optical axis but axially offset a second distance from the primary center of curvature of the concave surface portion in a direction away from the concave surface portion for acquiring a substantially focused image of the source reflected by the concave surface portion; and
wherein the first and second distances are approximately related by the equation $$(1-z_s/r1) \times (1 \times z_t/r1) = 1$$

where $z_s$ is the first distance, $z_t$ is the second distance and r1 is a primary radius of curvature of the concave reflecting surface portion of the primary reflector.

22. A system for condensing and collecting electromagnetic radiation comprising:
a primary reflector having a concave reflecting surface portion, the concave surface portion having an optical axis and a primary center of curvature disposed along the optical axis;
a source of electromagnetic radiation located approximately on the optical axis but axially offset a first distance from the primary center of curvature of the concave surface portion in a direction toward the concave surface portion;
a target located approximately on the optical axis but axially offset a second distance from the primary center of curvature of the concave surface portion in a direction away from the concave surface portion for acquiring a substantially focused image of the source reflected by the concave surface portion; and
wherein the concave surface portion comprises a substantially toroidal shape to form a toroidal surface portion having the primary center of curvature and a corresponding primary radius of curvature in a first plane and a secondary center of curvature and corresponding secondary radius of curvature in a second plane perpendicular to the first plane, the primary radius of curvature having a different length than the secondary radius of curvature for reducing optical aberrations caused by a particular source envelope surrounding the source by bringing a first image point produced by light rays in the first plane in coincidence with a second image point produced by light rays in the second plane.

23. A system for condensing and collecting electromagnetic radiation comprising:
a primary reflector having a concave reflecting surface portion, the concave surface portion having an optical axis and a primary center of curvature disposed along the optical axis;
a source of electromagnetic radiation located approximately on the optical axis but axially offset a first distance from the primary center of curvature of the concave surface portion in a direction toward the concave surface portion;
a target located approximately on the optical axis but axially offset a second distance from the primary center of curvature of the concave surface portion in a direction away from the concave surface portion for acquiring a substantially focused image of the source reflected by the concave surface portion;
wherein the system further comprises a secondary reflector disposed substantially opposite from the concave reflecting portion of the primary reflector relative to the source for reflecting radiation emitted from the source back through the source and onto the concave reflecting surface portion of the primary reflector;
wherein the system further comprises a housing having sides with inner surfaces forming the primary reflector and the secondary reflector; and
wherein the housing further comprises a top and a bottom affixed to the sides of the housing to form a sealed enclosure capable of being filled with a pressurized gas.

* * * * *